United States Patent
Yamauchi et al.

(10) Patent No.: US 7,367,435 B2
(45) Date of Patent: May 6, 2008

(54) SHOCK ABSORBER DESIGN METHOD

(75) Inventors: Hiroshi Yamauchi, Aichi (JP); Nakaaki Himeki, Aichi (JP); Toshihiko Sugahara, Aichi (JP); Akiyoshi Yanagita, Aichi (JP); Yuzo Niina, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/448,192

(22) Filed: May 30, 2003

(65) Prior Publication Data

US 2004/0026197 A1 Feb. 12, 2004

(30) Foreign Application Priority Data

May 31, 2002 (JP) .............................. 2002-160657

(51) Int. Cl.
*F16F 9/00* (2006.01)
(52) U.S. Cl. ................................. 188/322.22
(58) Field of Classification Search ................ 188/288, 188/322.18, 322.22
See application file for complete search history.

(56) References Cited

U.S. PATENT DOCUMENTS

| | | | | |
|---|---|---|---|---|
| 3,212,411 A | * | 10/1965 | Storms | 92/248 |
| 3,722,640 A | * | 3/1973 | Taylor | 188/322.22 |
| 3,726,368 A | * | 4/1973 | Taylor | 188/289 |
| 4,325,468 A | * | 4/1982 | Siorek | 188/282.8 |
| 4,558,767 A | * | 12/1985 | Taylor | 188/322.22 |
| 4,582,303 A | * | 4/1986 | Taylor | 188/322.17 |
| 4,821,852 A | | 4/1989 | Yokoya | |
| 4,908,415 A | | 3/1990 | Aramaki et al. | |
| 4,923,761 A | | 5/1990 | Shindo | |
| 5,293,968 A | | 3/1994 | Schuelke et al. | |
| 5,300,366 A | * | 4/1994 | Nakamaru et al. | 428/549 |
| 5,354,622 A | * | 10/1994 | Nakamaru et al. | 428/551 |
| 5,878,851 A | | 3/1999 | Carlson et al. | |
| 2002/0056368 A1 | | 5/2002 | May | |

FOREIGN PATENT DOCUMENTS

DE 3728273 A1 5/1988

(Continued)

OTHER PUBLICATIONS

Gerthsen, Kneser, Vogel: "Physik," 13th edition, pp. 66-67, edited by Springer-Verlag, Berlin Heidelberg New York, 1997.

(Continued)

*Primary Examiner*—Thomas Williams
(74) *Attorney, Agent, or Firm*—Birch, Stewart, Kolasch & Birch, LLP

(57) ABSTRACT

A shock absorber preferably used for an automobile aims at inhibition of noise caused by self-induced vibration. The shock absorber includes a piston, a working cylinder for housing the piston; and a rod, one end of which being attached to the piston and the other end of which projecting from the working cylinder, wherein a friction coefficient μ between the piston and the working cylinder is represented by the formula $\mu \leq 3h^2/rl$, where, r is the radius of the piston; 2h is the height of the piston; and l is the length of a portion of the rod, which portion is stored in the working cylinder when the piston is neutral.

3 Claims, 6 Drawing Sheets

FOREIGN PATENT DOCUMENTS

| | | |
|---|---|---|
| DE | 3819817 C1 | 9/1989 |
| DE | 3740565 C2 | 6/1992 |
| DE | 3720584 C2 | 2/1993 |
| DE | 4139821 A1 | 6/1993 |
| DE | 4302624 C1 | 5/1994 |
| DE | 19634014 C2 | 2/1998 |
| DE | 7021105 U | 4/2000 |
| DE | 19847343 A1 | 4/2000 |
| DE | 69705951 T2 | 4/2002 |
| JP | 61116138 | 6/1986 |
| JP | 5-231459 A | 9/1993 |
| JP | 7-301273 A | 11/1995 |
| JP | 2525265 Y2 | 11/1996 |
| JP | 10-259847 A | 9/1998 |
| JP | 2001059537 | 3/2001 |

OTHER PUBLICATIONS

J. Reimpell, H. Stoll: "Fahrwerktechnik: Stoβ-und Schwingungsdämpfer- Under-carriage techniques: shock absorbers and vibration dampers," 2nd edition, pp. 39, 62, 93-99, edited by Vogel Buchverlag, Würzburg 1989.

W.J. Bartz; "Selbstschmierende und wartungsfreie Gleitlager," "Self-lubricating and maintenance-free friction bearings," p. 154, edited by Expert Verlag Ehningen 1993.

Gerhartz; "Ullman's Encyclopedia of Industrial Chemistry," Fifth Edition, vol. A11, pp. 397-399, edited by VCH Verlagsgesellschaft, Weinheim 1998.

* cited by examiner

DETAILS OF b PART

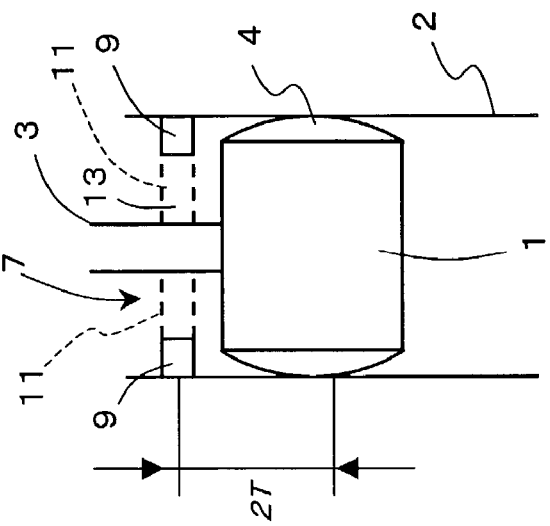
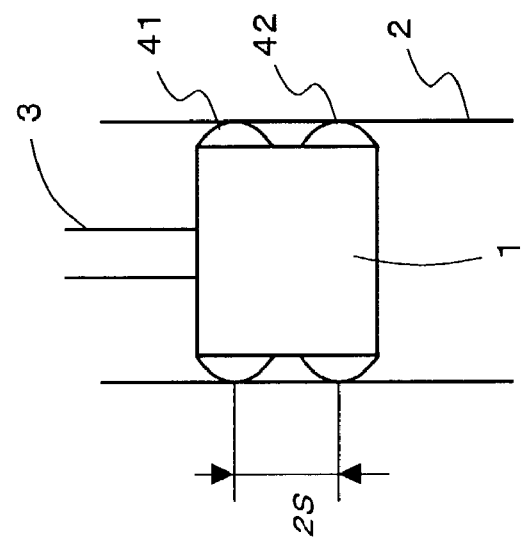
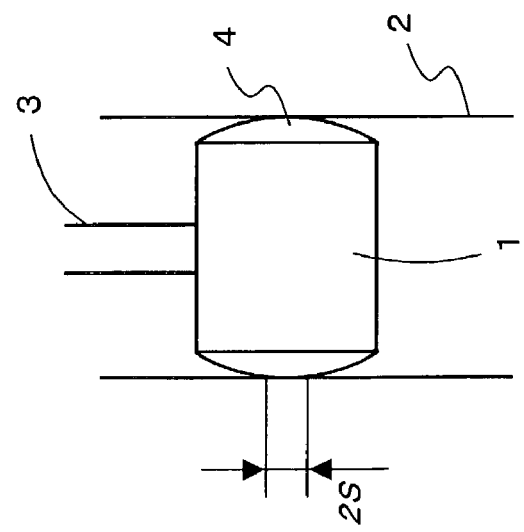

- 3: ROD
- a PART
- 1: PISTON
- 4: MOLD
- 5: RESERVOIR
- 2: WORKING CYLINDER

CONTACT DRAG FORCE

DETAILS OF a PART

SELF-INDUCED VIBRATION

SHOCK ABSORBER DESIGN METHOD

BACKGROUND OF THE INVENTION

1. Field of the Invention

The present invention relates to a shock absorber preferably used for a suspension of a vehicle, such as an automobile.

2. Description of the Related Art

Accompanying drawing FIG. 6a is a sectional view illustrating a conventional shock absorber generally known in the art. The shock absorber in the drawing comprises a working cylinder 2 and a reservoir 5. Into the inside of the working cylinder 2, a piston 1 is slideably inserted. A rod 3 is fixed to the piston 1. Further, a piston mold 4, serving to function as a seal member, is arranged around the piston 1 so as to maintain liquid tightness with the working cylinder 2.

When external force applied by the rod 3 causes the piston 1 to move up and down (in other words, application of external force causes the working cylinder 2 to move up and down), oil moves between the inside of the working cylinder 2 and the inside of the reservoir 5 in accordance with the change in volume of the working cylinder 2. At that time, the viscosity resistance of the moving oil reduces vibration.

However, as shown in accompanying drawing FIG. 6b, a conventional shock absorber includes a piston mold 4 having a short contacting span with respect to a working cylinder 2, so that there has been a problem that possible noise (especially knock noise) generation depends on the extent of contact resistance of the piston mold 4.

Namely, in a shock absorber, contact of the piston mold 4 with the working cylinder 2 generates a drag force, which further causes a moment in the piston 1 so that a short span tends to be a cause of unstable vibration. Unstable vibration frequently results in self-induced vibration as shown in FIG. 7.

SUMMARY OF THE INVENTION

With the foregoing problems in view, it is an object of the present invention to provide a shock absorber which is able to inhibit noise caused by self-induced vibration by making a rod-piston system, which is inclined to be an unstable vibration system, a stable vibration system.

To attain the above object, as a first generic feature, there is provided a shock absorber comprising: a piston; a working cylinder for housing the piston; and a rod, one end of which being attached to the piston and the other end of which projecting from the working cylinder; wherein a friction coefficient $\mu$ between the piston and the working cylinder is represented by the formula $\mu \leq 3h^2/rl$ (where, r is the radius of the piston; h is half the height of the piston; and l is the length of a portion of the rod, which portion is stored in the working cylinder when the piston is neutral).

The shock absorber designed and shaped as above makes a rod-piston system a stable vibration system, so that noise generation is inhibited.

As a preferable feature, the friction coefficient $\mu$ may be in the range of $0 < \mu \leq 0.1$.

As another preferable feature, in the shock absorber, the formula $0.1 \leq 3h^2/rl$ may be fulfilled.

As an additional feature, the friction coefficient $\mu$ may be in the range of $0.05 \leq \mu \leq 0.08$.

As a second generic feature, there is provided a shock absorber comprising: a piston; a working cylinder for housing the piston; a rod, one end of which being attached to the piston and the other end of which projecting from the working cylinder; and a piston mold arranged around the outer circumference of the piston and which includes at least an upper mold and a lower mold.

As a third generic feature, there is provided a shock absorber comprising: a piston; a working cylinder for housing the piston; a rod, one end of which being attached to the piston and the other end of which projecting from the working cylinder; and a piston mold arranged around the outer circumference of the piston; wherein a friction coefficient $\mu$ between the piston and the working cylinder is represented by the formula $\mu \leq 3S^2/rl$ (where, r is the radius of the piston; S is half the interval length between the upper contact end of the piston mold with respect to the working cylinder and the lower contact end of the piston mold with respect to the working cylinder; and l is the length of a portion of the rod, which portion is stored in the working cylinder when the piston is neutral).

As a preferable feature, the piston mold may be in the form of at least two parts including the top mold part and the lowest mold part; the upper contact end may be the top point of the top mold part which point is in contact with the working cylinder; and the lower contact end may be the lowest point of the lowest mold part which point is in contact with the working cylinder.

As another preferable feature, the friction coefficient $\mu$ may be in the range of $0 < \mu \leq 0.1$.

As an additional preferable feature, in the shock absorber, the formula $0.1 \leq 3S^2/rl$ may be fulfilled.

As a fourth generic feature, there is provided a shock absorber comprising: a piston; a working cylinder for housing the piston; a rod, one end of which being attached to the piston and the other end of which projecting from the working cylinder; a ring including a circumference contacting part in contact with the inner circumference of the working cylinder and arranged over or under the piston, and a coupling part one end of which being attached to the circumference contacting part and the other end of which being fixed to the rod or to the piston.

As a fifth generic feature, there is provided a shock absorber comprising: a piston; a working cylinder for housing the piston; a rod, one end of which being attached to the piston and the other end of which projecting from the working cylinder; and a ring in contact with the inner circumference of the working cylinder and arranged over or under the piston; wherein a friction coefficient $\mu$ between the piston and the working cylinder is represented by the formula $\mu \leq 3T^2/rl$ (where, r is the radius of the piston; 2T is the interval length between the contact point between the working cylinder and the ring and that between the working cylinder and the piston; and l is the length of a portion of the rod, which portion is stored in the working cylinder when the piston is neutral).

As a preferable feature, the friction coefficient $\mu$ may be in the range of $0 < \mu \leq 0.1$.

As another preferable feature, in the shock absorber, the formula $0.1 \leq 3T^2/rl$ may be fulfilled.

As an additional feature, the friction coefficient $\mu$ may be in the range of $0.05 \leq \mu \leq 0.08$.

Other objects and further features of the present invention will be apparent from the following detailed description when read in conjunction with the accompanying drawings.

BRIEF DESCRIPTION OF THE DRAWINGS

FIGS. 4a to 4c are diagrams respectively illustrating construction of a piston mold of the shock absorber according to the present invention;

DETAILED DESCRIPTION OF THE INVENTION

A shock absorber of an embodiment of the present invention will now be described with reference to the accompanying drawings.

Figure 1:
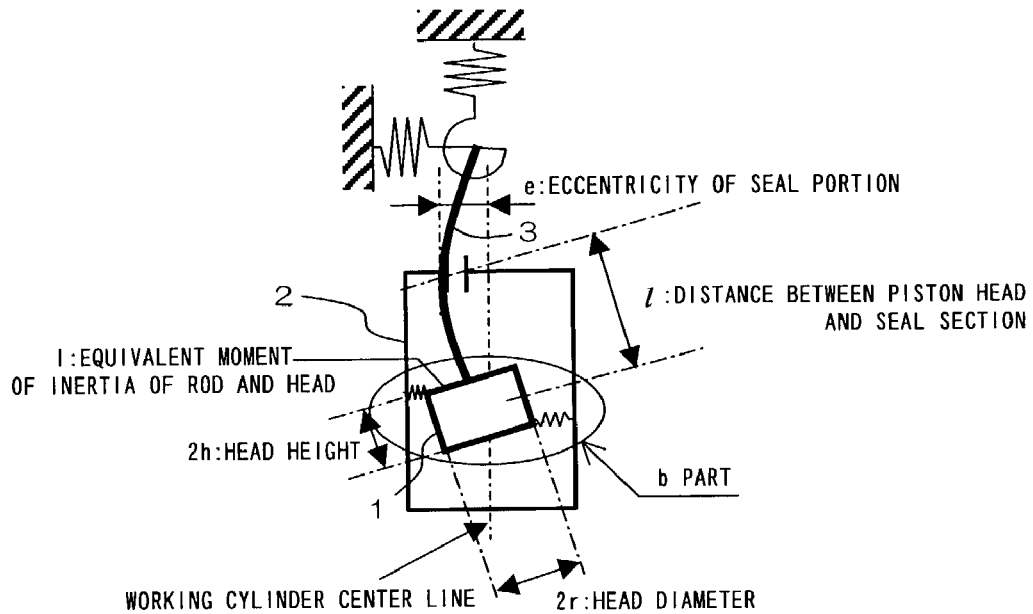
FIG. 1 is a front view illustrating a physical model of a shock absorber for theoretical analysis according to a first embodiment of the present invention.

As shown in FIG. 1, a shock absorber according to a first embodiment of the present invention comprises a piston (a piston head) 1, a working cylinder 2 for housing the piston 1, and a rod 3 one end of which is attached to the piston 1 and the other end of which projects from the working cylinder 2.

Hereinafter, examination of force acting on the shock absorber will now be made with reference to the physical model of FIG. 1. The drag force and the friction force acting on the piston head 1 are distributionally applied to the overall outer circumference of the piston head 1 while, for the sake of simplified explanation, the drag force ($N_r$, $N_l$) and the friction force ($\mu N_r$, $\mu N_l$) are assumed to be intensively applied to two portions of the piston head 1, as shown in the drawing. This assumption preserves the features of the present invention.

Figure 3:
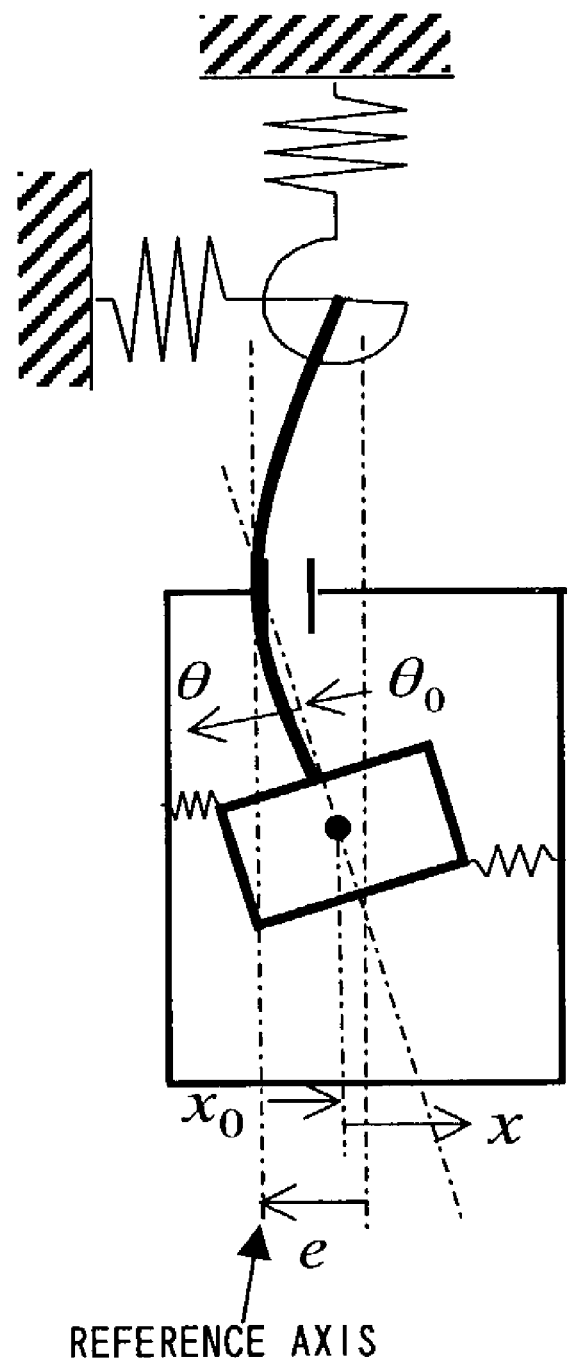
FIG. 3 is a diagram illustrating a physical model of a shock absorber for theoretical analysis in order to explain force balance in the shock absorber according to the first embodiment.
Figure 5:
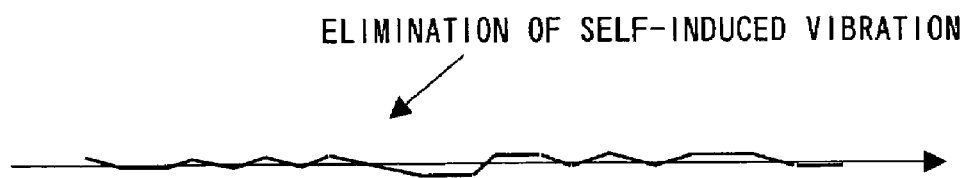
FIG. 5 is a diagram showing elimination of self-induced vibration of the shock absorber of the first embodiment.
Figure 6A:
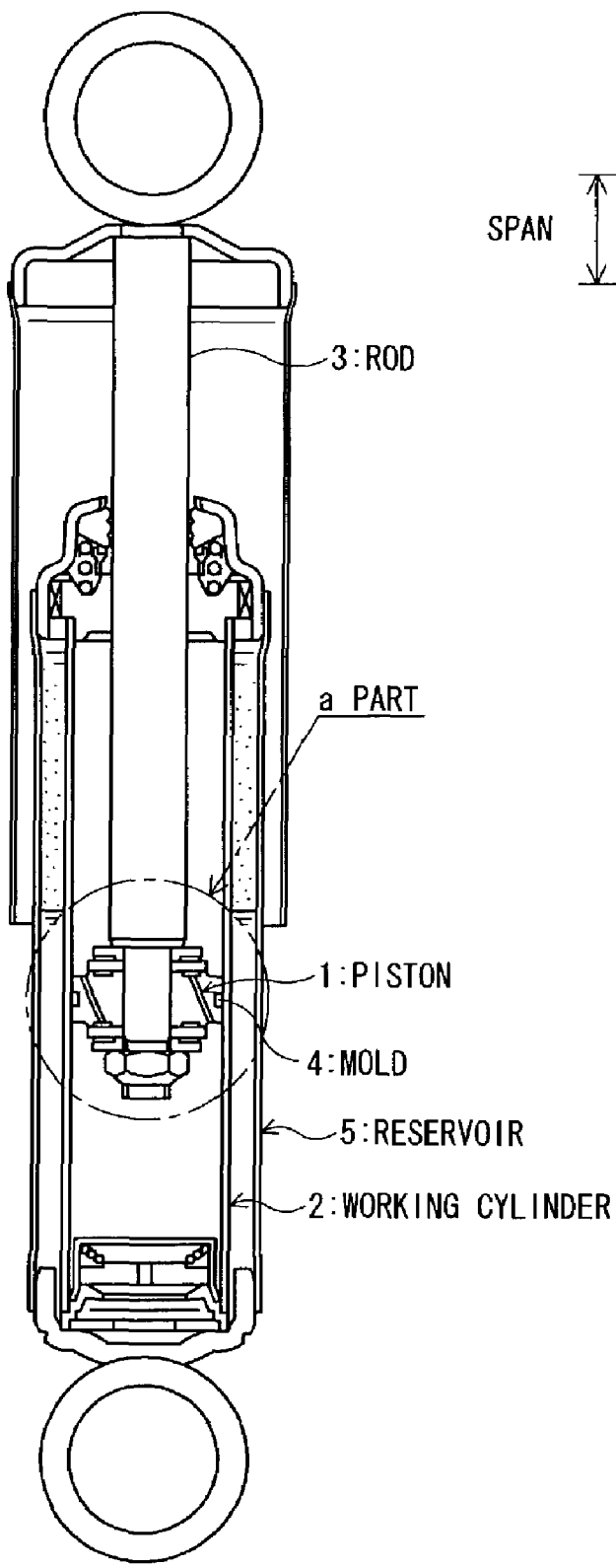
FIGS. 6a and 6b are sectional views of a general shock absorber.
Figure 6B:
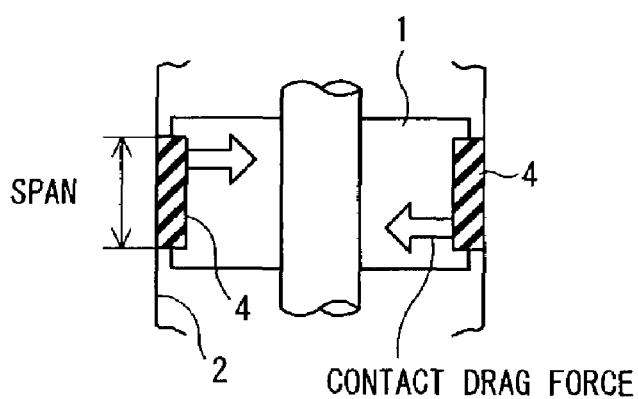
Figure 7:
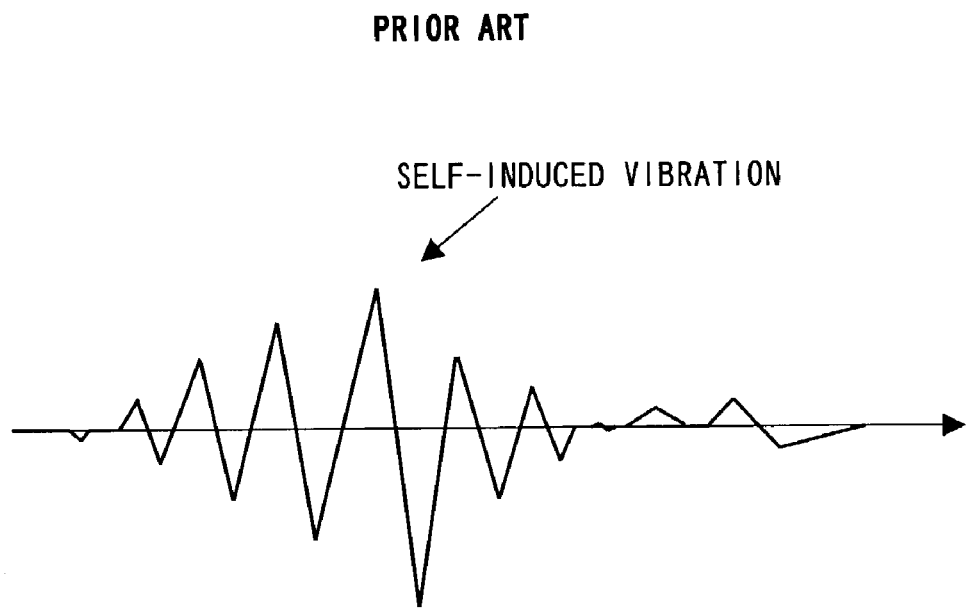
FIG. 7 is a diagram showing a problem in the prior art.

The rotation angle $\theta$ shown in FIG. 3 represents the complementary angle defined in terms of the central axis of the rod 3 and the central axis of the working cylinder 2 but does not represent the rotation angle of the central axis of the rod 3 with respect to the vertical axis. The displacement x in the translation direction represents the displacement from the reference axis of the piston head 1. The reference axis is parallel to the central axis of the working cylinder 2 and is moved parallel from the central axis of the working cylinder 2 as much as distance e.

Further, the initial rotation angle $\theta_0$ and the initial displacement $x_0$ are determined by the initial moment applied to the shock absorber, and depend on a back-and-forth displacement of the unsprung portion generated during movement of a vehicle besides a shared vehicle weight and a coil spring. The initial displacement $x_0$ is a displacement generated by installing the rod 3 on the working cylinder 2 and thereby represents a displacement between the engaging portion of the rod 3 with the working cylinder 2 and the center of gravity of the piston head 1.

Figure 2:
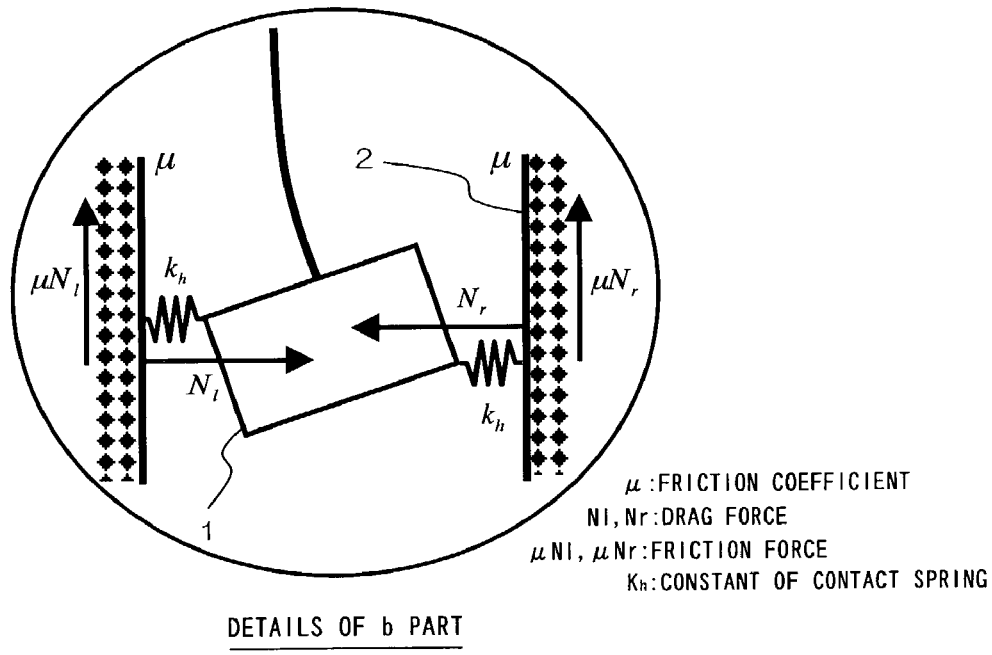
FIG. 2 is an enlarged view of b part in FIG. 1.

In order to simulate vibration accompanied by friction force likewise the present model, the use of a contact spring (having the spring constant $k_h$) is effective whereupon examination of the shock absorber of the present invention introduces such a contact spring (see FIG. 2).

Hereinafter, examination will be made assuming that the unsprung portion is moving downward (i.e., the working cylinder 2 is moving downward). The radius of the piston head 1 is represented by r; half the height of the piston head 1, h; a friction coefficient between the piston head 1 and working cylinder 2, $\mu$; and the length of a portion of the rod 3, which portion is stored in the working cylinder 2, 1. More specifically, the length l of the rod 3 represents the distance between the center of gravity of the piston head 1 and the engaging portion (the seal portion) of the rod 3 and the working cylinder 2 when the piston head 1 is neutral, during which the piston head 1 is not vibrating.

Here, the neutral point of the piston head 1 when the piston head 1 is not vibrating is examined. As shown in FIG. 3, the presence of the eccentricity e causes the piston head 1 to be neutral at the position departing from the vertical center line of the case cylinder of the shock absorber, so that the rod 3 is neutral in the state that the rod 3 is bent by the application of the initial load.

At this time, the drag forces $N_l$ and $N_r$ at the contact points are represented by the following formulae when the initial displacement of the piston head 1 in FIG. 3 is represented by $x_0$; the rightward displacement from the initial displacement $x_0$ in the drawing, x; the initial rotation angle, $\theta_0$; and the rotation angle in the counterclockwise direction in the drawing, $\theta$.

$$N_l = k_h(e - x_0 - x + h\theta + h\theta_0)$$

$$N_r = k_h(-e + x_0 + x + h\theta + h\theta_0)$$

Further, the friction forces $F_l$ and $F_r$ caused by contact are represented by the following formulae.

$$F_l = \mu N_l$$

$$F_r = \mu N_r$$

The position at which these friction forces balance with the flexural rigidity of the rod 3 is the neutral points of the piston head 1. Accordingly, in a static state, the initial displacement $x_0$ of the piston head 1 and the initial rotation angle $\theta_0$ respectively meet the following formulae (1) and (2) when the moment of inertia of area of the rod 3 is represented by $I_z$.

$$\theta_0 = -\frac{Ml}{EI_z} - \frac{Fl^2}{2EI_z} \quad (1)$$

$$x_0 = -\frac{Ml^2}{2EI_z} - \frac{Fl^3}{3EI_z} \quad (2)$$

where, $F = 2(e - x_0)$, $M = -2hk_n\theta_0$, and E is the Young's modulus of the rod 3.

The above conditions introduce the following equation of motion in relation to vibration, focusing on the neutral point of the system.

$$m\ddot{x} + \left(\frac{12EI_z}{l^3} + 2k_h\right)x - \frac{6EI_z}{l^2}\theta = 2k_h(e - x_0)$$

$$I_z\ddot{\theta} - \left(\frac{6EI_z}{l^2} - 2\mu k_h r\right)x + \left(\frac{4EI_z}{l} + 2k_h k^2\right)\theta = -2k_h\{h^2\theta_0 - \mu r(e - x_0)\}$$

In the above two-degree-of-freedom system, a necessary condition that makes the system unstable is that coefficients $(-6EI_z/l^2)$ and $(-6EI_z/l^2 + 2\mu k_h r)$ of the coupling effects are opposite signs to each other.

Therefore, when the system fulfills the following formula (3), there is the possibility that the system sets up self-induced vibration.

$$-\frac{6EI}{l^2} + 2\mu k_h r > 0 \qquad (3)$$

Further, the formula (3) can be written into the below formula (4) when introducing the foregoing formulae (1) and (2) that are satisfied when the system is neutral.

$$\mu > \frac{3h^2}{rl} \qquad (4)$$

Namely, if the friction coefficient is large enough to satisfy the formula (4) when $\mu>0$, i.e., there is a possibility of self-induced vibration when the unsprung portion is descending. On the other hand, when the unsprung portion is ascending, $\mu<0$ is satisfied so that the formula (4) is not fulfilled and the system is stable. This is summarized as follows:

If the formula $\mu \leq 3h^2/rl$ is fulfilled even when the unsprung portion is descending, self-induced vibration is not generated. Such vibration is measured in the form of back-and-forth vibration of the rod 3 and this theory is in agreement with the tendency of the data obtained in an actual running test of a vehicle.

On the basis of the above facts, setting that satisfies $\mu \leq 3h^2/rl$ can inhibit generation of noise (especially, knock noise) at the shock absorber.

As is clear from the above formula, the following preferable conditions 1 to 3 effectively inhibit generation of knock noise:

1. A larger height of the piston head 1;
2. A shorter distance between the piston head 1 and the seal portion; and
3. A smaller diameter of the piston head 1.

When the shock absorber fulfills the above conditions 1 to 3, self-induced vibration is largely inhibited.

Hereinafter, an operative example of the piston head 1 will now be described. As shown in FIG. 4a, a piston mold 4, serving as a seal member, is usually arranged around the outer circumference of the piston head 1. In this instance, since the interval length (a span having a length 2S) of contact portions between the piston mold 4 and the working cylinder 2 corresponds to half the height h of the piston head 1, the formula $\mu \leq 3h^2/rl$ can be written into another formula $\mu \leq 3S^2/rl$. If the length of the piston mold 4 is set so as to meet the above formula, it is possible to inhibit self-induced vibration when the unsprung portion is descending.

As shown in FIG. 4b, the piston mold 4 may be further divided into two parts; an upper mold part 41 and a lower mold part 42. Under the assumption that the height of the piston head 1 is constant, the two-part-divided mold causes the span to be defined in terms of interval length of contact portions of the mold with the working cylinder 2 longer as compared with the non-divided-shape piston mold 4 of FIG. 4a. Namely, the two-part-divided mold of FIG. 4b can be regarded to be identical with making the height of the piston head 1 larger whereupon it is possible to further inhibit self-induced vibration.

Alternatively, the piston mold 4 may be divided into two or more parts that are vertically arranged. In this case, the length 2S corresponds to the interval between the contact portion between the top mold part and the working cylinder 2 and that between the lowest mold part and the working cylinder 2. A preferable friction coefficient is equal to or less than 0.1, and, more preferably, in the range of 0.05 through 0.08.

As another alternative, a hollow ring 7 may be arranged in contact with the inner circumference of the working cylinder 2 over the piston head 1. The ring 7 includes a circumference contacting part 9 which is in contact with the inner circumference of the working cylinder 2 and a coupling part 11 divided into two pieces, each piece having an end attached to the contact circumference part 9 and the other end extending to the center of the working cylinder 2 so as to be attached to the rod 3. The coupling part 11 divided into only two pieces forms a space 13 inside which oil in the working cylinder 2 flows.

Here, since the interval length 2T between the contact point of the ring 7 with the working cylinder 2 and that of the piston mold 4 with the working cylinder 2 corresponds to half the height h of the piston head 1, the formula $\mu \leq 3h^2/rl$ can be written into another formula $\mu \leq 3T^2/rl$. If the position of the ring 7 is set so as to satisfy the above formula, it is possible to inhibit self-induced vibration when the unsprung portion is descending.

The configuration of the shock absorber satisfying the above formula can be regarded as making the height of the piston head 1 larger whereupon self-induced vibration can be further inhibited.

Alternatively, one end of each piece of the coupling part 11 of the ring 7 may be attached to the circumference contacting part 9 and, at the same time, the other end of the piece may be attached to the top surface of the piston head 1 so that the ring 7 is arranged on the piston head 1. Further alternatively, the ring 7 may be arranged under the piston head 1 and may be attached to the bottom surface of the piston head 1 by the coupling part 11.

As mentioned above, it is possible to make a rod-piston system a stable vibration system simply by setting the parts of the shock absorber of the first embodiment so as to satisfy the following formula $\mu \leq 3h^2/rl$, where r is the radius of the piston head 1; is half the height h of the piston head 1; $\mu$ is a friction coefficient between the piston head 1 and the working cylinder 2; and 1 is the length of a portion of the rod 3 which portion is stored in the working cylinder 2 so that, advantageously, self-induced vibration of the piston head 1 can be inhibited. More specifically, it is possible to inhibit generation of noise (so-called knock noise) when a vehicle drives on stone-paved road.

Since noise generation can be inhibited simply by setting the size of each part of the shock absorber so as to meet the above formula, there is no requirement for additional parts so that increases in costs and vehicle weight can be minimized. Especially, when the friction coefficient $\mu$ in the above formula is equal to or less than 0.1, preferably in the range between 0.05 and 0.08, it is advantageously possible to ensure the elimination of noise generation.

Division of the piston mold 4 into two parts in the vertical direction increases the contact span S between the piston head 1 and working cylinder 2, so that the division ensures the same effect as the increased height of the piston head 1.

Focusing on manufacturing of the shock absorber of the present invention, it is generally difficult to set an accurate friction coefficient between the piston head 1 and working cylinder 2 when designing shock-absorber parts, such as a piston, a rod, and a working cylinder. Further, even after the shock absorber is manufactured by assembling the shock-absorber parts, it is difficult to measure the accurate friction coefficient between the piston head 1 and working cylinder 2.

Accordingly, when the piston, the rod, the working cylinder and other parts are designed such that the right side of the above formula is set to a relatively small value (for example, $3h^2/rl=0.05$), it is impossible to inhibit generation of self-induced vibration if the friction coefficient between the piston and the working cylinder after assembly is larger than the set right side (for example, $3h^2/rl=0.07$).

Meanwhile, it is known in the art that it is relatively easy to make the friction coefficient between the piston and the working cylinder equal to or less than 0.08.

Therefore, it is possible to definitely fulfill the formula $\mu \leq 3h^2/rl$ by designing the piston, the working cylinder, the rod and other parts such that the right side of the formula becomes equal to or larger than 0.1 (e.g., $0.1 \leq 3h^2/rl$) considering an assembling error when manufacturing. Despite difficulty in setting an accurate friction coefficient between the piston 1 and the working cylinder 2 when designing the shock absorber, it is therefore possible to definitely inhibit generation of self-induced vibration.

Further, the present invention should by no means be limited to this foregoing embodiment, and various changes or modifications may be suggested without departing from the gist of the invention.

What is claimed is:

1. A shock absorber design method for a vehicle suspension, comprising:

providing a piston having a radius r and a height 2h;

providing a working cylinder for housing said piston;

providing a rod, one end of which being attached to said piston and the other end of which projecting from said working cylinder, a length l being defined as a distance between a center of gravity of the piston and an engaging portion of the rod and the working cylinder when said piston is at a neutral position, in which the rod is in a neutral state where the rod is bent by application of an initial load; and, determining said radius r, half of said height 2h, and said length l to satisfy $\mu \leq 3h^2/rl$ ($0 \leq \mu$), where $\mu$ is a friction coefficient between said piston and said working cylinder.

2. The shock absorber design method according to claim 1, wherein said friction coefficient $\mu$ is in the range of about $0 < \mu \leq 0.1$.

3. A shock absorber according to claim 2, wherein said friction coefficient $\mu$ is in the range of about $0.05 \leq \mu \leq 0.08$.

* * * * *